US012669175B2

(12) United States Patent
Stafford et al.

(10) Patent No.: US 12,669,175 B2
(45) Date of Patent: Jun. 30, 2026

(54) DROP-IN SIGNAL ACCUMULATOR PISTON KIT AND METHOD FOR REPLACING AN ORIGINAL EQUIPMENT SIGNAL ACCUMULATOR PISTON

(71) Applicant: Sonnax Transmission Company, Bellows Falls, VT (US)

(72) Inventors: Maura J. Stafford, Warner Robins, GA (US); Andrew M. Deyo, Keene, NH (US)

(73) Assignee: Sonnax Transmission Company, Bellows Falls, VT (US)

( * ) Notice: Subject to any disclaimer, the term of this patent is extended or adjusted under 35 U.S.C. 154(b) by 0 days.

(21) Appl. No.: 18/917,741

(22) Filed: Oct. 16, 2024

(65) Prior Publication Data

US 2025/0043862 A1 Feb. 6, 2025

Related U.S. Application Data

(63) Continuation of application No. 18/089,418, filed on Dec. 27, 2022, now Pat. No. 12,129,922, which is a
(Continued)

(51) Int. Cl.
*F16H 61/00* (2006.01)
*F15B 1/04* (2006.01)

(52) U.S. Cl.
CPC ..... *F16H 61/0009* (2013.01); *F16H 61/0021* (2013.01); *F15B 1/04* (2013.01);
(Continued)

(58) Field of Classification Search
CPC .... F15B 1/04; F15B 2201/21; F15B 2201/31; F15B 2201/312; F15B 2201/405;
(Continued)

(56) References Cited

U.S. PATENT DOCUMENTS

| | | | |
|---|---|---|---|
| 4,937,927 A | 7/1990 | Taipale | |
| 5,244,262 A | 9/1993 | Kehl | |

(Continued)

FOREIGN PATENT DOCUMENTS

| | | | | |
|---|---|---|---|---|
| DE | 102012219054 A1 * | 4/2014 | ............. | B60T 15/36 |
| DE | 102015214202 A1 | 2/2017 | | |

(Continued)

OTHER PUBLICATIONS

DE102012219054A1 machine translation (Year: 2014).*

*Primary Examiner* — Matthew Wiblin
(74) *Attorney, Agent, or Firm* — ANDRUS INTELLECTUAL PROPERTY LAW, LLP

(57) ABSTRACT

A drop-in signal accumulator piston assembly to replace an original equipment (OE) signal accumulator piston in a vehicle transmission hydraulic circuit, the OE signal accumulator piston positioned in a bore in a valve body having a fluid port. A cylindrical sleeve has open first and second ends with an internal diameter that reduces at a transition therebetween. A piston is positioned in the sleeve and has open and closed ends. The cylindrical sleeve is configured such that the transition in the internal diameter limits movement of the piston within the cylindrical sleeve. A spring is positioned in part in the open end of the piston and in part extending beyond an end of the piston. The sleeve is positioned in the valve body bore, with the piston and the spring positioned in the sleeve. The sleeve, the piston, and the spring are enclosed within the valve body bore.

20 Claims, 9 Drawing Sheets

Related U.S. Application Data continuation-in-part of application No. 17/527,946, filed on Nov. 16, 2021, now Pat. No. 11,933,326.

(60) Provisional application No. 63/115,924, filed on Nov. 19, 2020.

(52) U.S. Cl.
CPC ....... *F15B 2201/21* (2013.01); *F15B 2201/31* (2013.01); *F15B 2201/312* (2013.01); *F15B 2201/405* (2013.01); *F15B 2201/60* (2013.01); *F15B 2201/61* (2013.01); *F16H 2061/0034* (2013.01)

(58) Field of Classification Search
CPC .......... F15B 2201/4056; F15B 2201/60; F15B 2201/61; F16H 61/0009; F16H 2061/0034; F16H 2061/305; F16J 10/04
See application file for complete search history.

(56) References Cited

U.S. PATENT DOCUMENTS

| | | | |
|---|---|---|---|
| 5,354,187 | A | 10/1994 | Holland |
| 5,975,653 | A | 11/1999 | Zaviska |
| 6,390,133 | B1 | 5/2002 | Patterson |
| 6,979,063 | B2 | 12/2005 | Ohishi |
| 7,066,208 | B2 | 6/2006 | Kort |
| 7,992,300 | B1 | 8/2011 | Weh |
| 9,073,526 | B2 | 7/2015 | Kodama |
| 10,422,354 | B2 | 9/2019 | Takahashi |
| 2012/0312406 | A1 | 12/2012 | Warnke |
| 2013/0032117 | A1 | 2/2013 | Worthington |
| 2021/0054925 | A1 | 2/2021 | Oesch |

FOREIGN PATENT DOCUMENTS

| | | | | | |
|---|---|---|---|---|---|
| KR | 100373025 | B1 | * | 2/2003 | ......... F16H 61/0009 |
| WO | 2011047776 | A2 | | 4/2011 | |

* cited by examiner

Solenoid Feed

Drilled passage connects solenoid output to 1278R control valve

104

Solenoid output output connection to damper

B

B

114

Pump output

Solenoid output connected to PT1

108, 110

108, 112

Pump output connection to PT3

102

Pump output

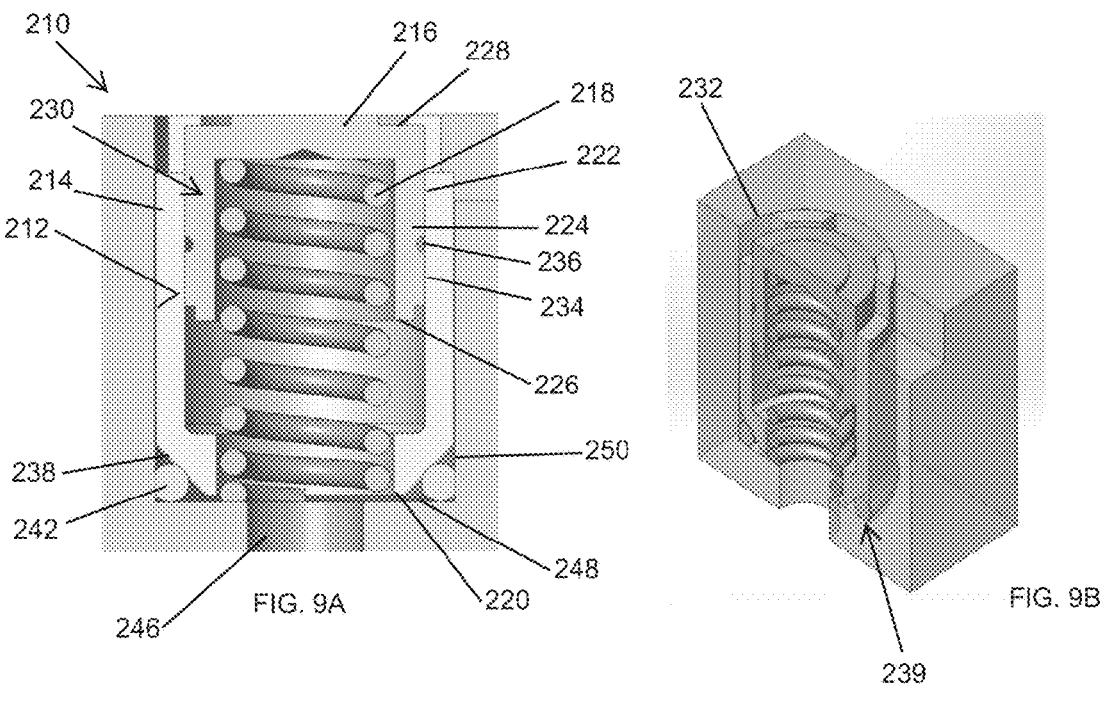
FIG. 9A
FIG. 9B
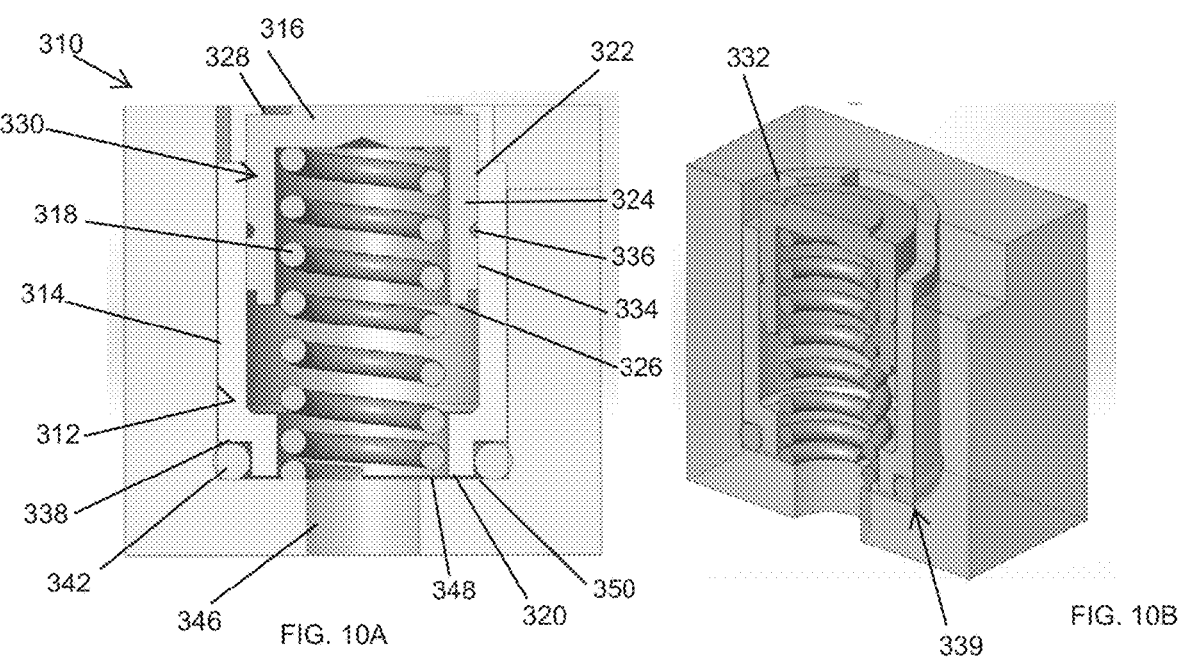
FIG. 10A
FIG. 10B

DROP-IN SIGNAL ACCUMULATOR PISTON KIT AND METHOD FOR REPLACING AN ORIGINAL EQUIPMENT SIGNAL ACCUMULATOR PISTON

CROSS-REFERENCE TO RELATED APPLICATION DATA

This application is a continuation of U.S. patent application Ser. No. 18/089,418, filed Dec. 27, 2022, which is a continuation-in-part of U.S. patent application Ser. No. 17/527,946, filed Nov. 16, 2021, which claims the benefit of and priority to U.S. Provisional Patent Application No. 63/115,924, filed Nov. 19, 2020, all of which are hereby incorporated by reference in their entireties.

BACKGROUND

The present disclosure relates to a replacement kit for signal accumulator pistons in control solenoid valves in a vehicle transmission, and more particularly to a drop-in kit for replacement signal accumulator pistons in original equipment (OE) control solenoid valve bodies.

Control solenoids in a vehicle transmission supply control fluid for the proper operation, e.g., shifting, of the vehicle transmission. Proper operation is accomplished by controlling the pressure in and through solenoid valves that control the actuation (engagement and disengagement) of clutches in the transmission. Signal accumulators dampen or smooth out the signal fluid pressure applied from each control solenoid before the fluid flows to a control valve, thus providing for smoother operation of the transmission.

Wear in the signal accumulator piston bores in the control valve body results in loss of the variable force solenoid (VFS) signal pressure. Pressure loss results in poor shift control (soft shifts), no converter apply, hydraulic-related converter warning codes, and burnt clutches.

Known ways in which to address signal loss due to low or loss of fluid line pressure resulting from wear in piston bore in the control valve body include replacing the control valve body or boring out (e.g., machining or reaming) the bore and installing an oversized piston. Both of these solutions are costly and time consuming solutions.

Accordingly, there is a need for an assembly or kit for replacing the signal accumulator pistons in an OE control solenoid valve body. Desirably, such an assembly can be installed in the OE control solenoid valve body without modification of the valve body. More desirably still such an assembly restores hydraulic control, maintaining proper fluid line pressure control.

SUMMARY

In one aspect of the present disclosure a drop-in signal accumulator piston assembly replaces an original equipment (OE) signal accumulator piston in a vehicle transmission hydraulic circuit. The OE signal accumulator piston is positioned in a bore in a valve body having a fluid port.

The drop-in signal accumulator piston assembly includes a cylindrical sleeve having open first and second ends and a piston positioned in the sleeve. The piston is cup-shaped, having an open end and a closed end.

A spring is positioned in part in the open end of the piston and in part extending beyond an end of the piston. The sleeve is positioned in the valve body bore, with the piston and the spring positioned in the sleeve, and the sleeve, the piston, and the spring are enclosed within the valve body bore.

In an embodiment, the piston includes a plurality of circumferential recesses in an outer wall thereof. The sleeve includes a receiving region for receiving a seal. The seal is positioned between the sleeve and the valve body bore. In some embodiments the receiving region is a circumferential recess; in some embodiments the receiving region is a chamfered end wall in the sleeve; and in some embodiments the receiving region is a stepped region in the sleeve.

In embodiments, an end of the spring abuts an inner end wall of the piston and an opposite end of the spring abuts an inner wall of the valve body. In embodiments, the sleeve has a first wall thickness and a second wall thickness greater than the first wall thickness, and the circumferential recess is in a portion of the sleeve at the second wall thickness.

In embodiments, the assembly further includes a plug positioned in the valve body bore adjacent the sleeve. The plug can be positioned in the valve body bore adjacent the sleeve, to enclose the sleeve, the piston, and the spring in the valve body bore. The plug can include a receiving region for receiving a seal, which seal is positioned between the plug and the valve body bore. The receiving region can be a circumferential recess in the plug.

In embodiments, the plug includes an axial through hole. An end of the spring can abut an inner end wall of the piston and an opposite end of the spring can abut the plug.

In another aspect, a method for replacing an original equipment (OE) signal accumulator piston in a vehicle transmission hydraulic circuit, the OE signal accumulator piston positioned in a bore in a valve body having a fluid port is disclosed.

The method includes removing the OE signal accumulator piston from the bore, installing a cylindrical sleeve having open first and second ends in the bore, positioning a piston in the sleeve, and positioning a spring in part in the piston and in part extending beyond the piston. The sleeve, the piston, and the spring are enclosed within the valve body bore, and a head of the piston is positioned in facing relationship to the fluid port.

In methods the piston includes a plurality of circumferential recesses in an outer wall thereof, and in methods sleeve includes a circumferential recess, and further includes a seal positioned in the recess.

The method may include a sleeve having a first wall thickness and a second wall thickness greater than the first wall thickness, such that the circumferential recess is in a portion of the sleeve at the second wall thickness.

In still another aspect, a drop-in signal accumulator piston assembly replaces an original equipment (OE) signal accumulator piston in a vehicle transmission hydraulic circuit, in which the OE signal accumulator piston is positioned in a bore in a valve body having an open end and a fluid port.

The drop-in signal accumulator piston assembly includes a cylindrical sleeve having open first and second ends, one of the first and second open ends having a reduced diameter region relative to an outer wall of the sleeve, a piston positioned in the sleeve, a spring positioned in part in the piston and in part extending beyond and end of the piston and a seal positioned at the reduced diameter region.

The sleeve is positioned in the valve body bore, with the seal, the piston, and the spring, such that the seal is positioned between side and bottom walls of the valve body bore and wherein the seal provides a seal between the valve body bore and the sleeve.

In embodiments, the reduced diameter region is a chamfer formed in the sleeve. In embodiments, the reduced diameter region is an inwardly stepped region formed in the sleeve. And in embodiments, the reduced diameter region defines a circumferential recess and wherein the seal is positioned in the circumferential recess.

Further understanding of the present disclosure can be obtained by reference to the following detailed description in conjunction with the associated drawings, which are described briefly below.

DESCRIPTION OF THE DRAWINGS

An embodiment of a vehicle transmission is disclosed as an example and is not limited by the figures of the accompanying drawings, in which like references may indicate similar elements and in which:

FIGS. 1A and 1B are illustrations of an example of a control solenoid valve body for a vehicle transmission, in which FIG. 1A illustrates the valve body with a cover in place, and FIG. 1B illustrates the valve body with the cover removed;

FIGS. 9A and 9B are illustrations of another embodiment of the replacement accumulator piston kit FIG. 9A showing a front view of the replacement accumulator piston kit in cross-section and FIG. 9B showing a perspective view in cross-section;

FIGS. 10A and 10B are illustrations of still another embodiment of the replacement accumulator piston kit FIG. 10A showing the showing a front view of the replacement accumulator piston kit in cross-section and FIG. 10B showing a perspective view in cross-section;

DETAILED DESCRIPTION

Figure 1A:
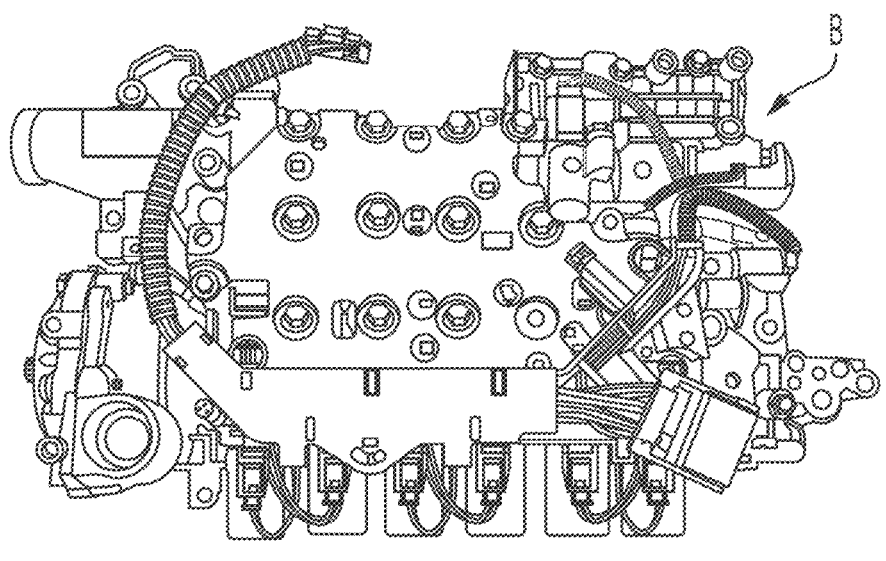

While the present disclosure is susceptible of embodiments in various forms, there is shown in the drawings and will hereinafter be described a presently preferred embodiment with the understanding that the present disclosure is to be considered an exemplification and is not intended to limit the disclosure to the specific embodiment illustrated.

Figure 1B:
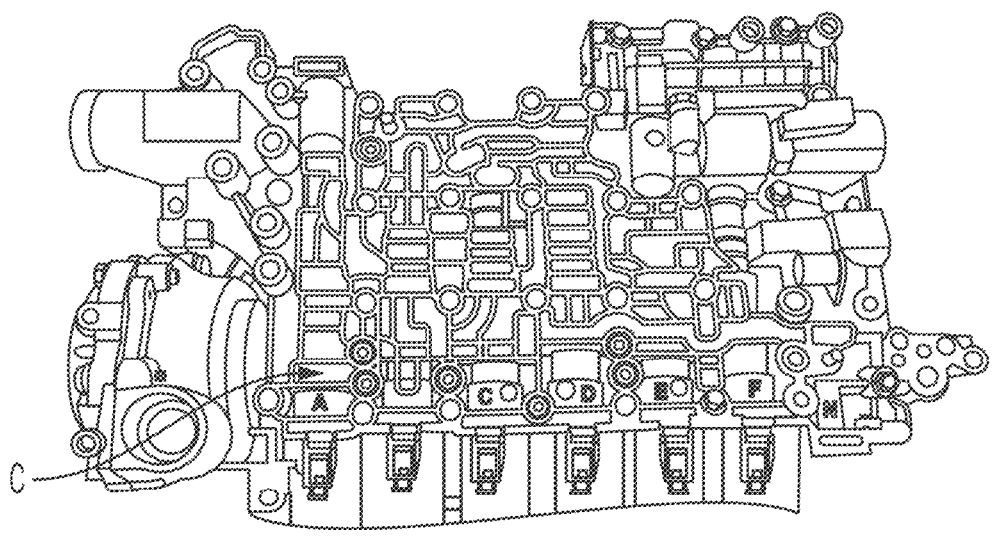
Figure 4:
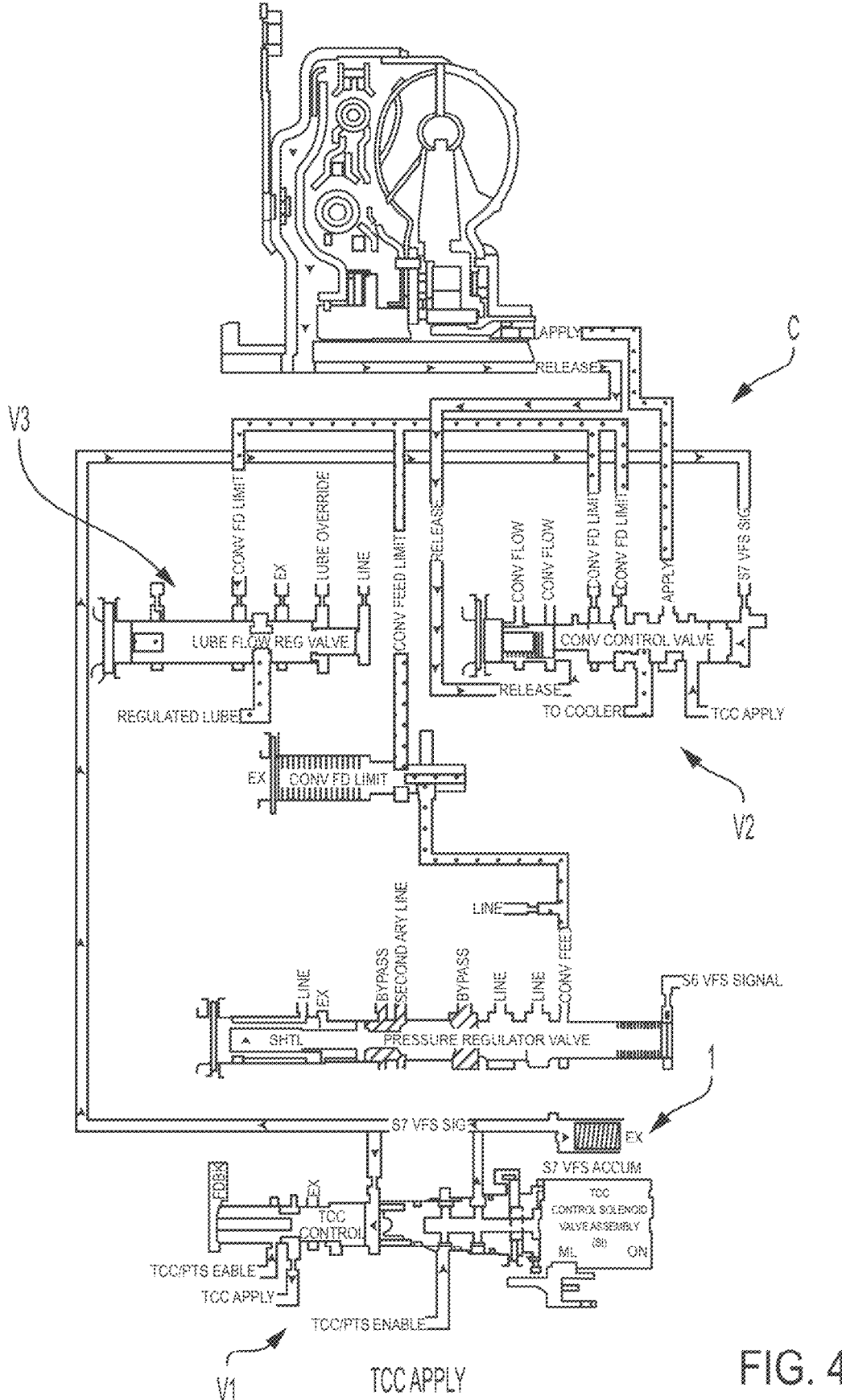
FIG. 4 is an illustration of a portion of a hydraulic control circuit for a vehicle transmission.

Referring briefly first to FIG. 1, there is shown a portion of a control valve body B that houses a hydraulic circuit C for a vehicle transmission. Now referring to FIG. 4, the circuit C includes, among other things, a torque converter clutch (TCC) control solenoid valve assembly V1, a converter control valve assembly V2, and a lube flow regulator valve V3. A signal accumulator 1 is illustrated associated with the TCC control solenoid valve assembly V1. The components are housing within the control valve body B. It will be appreciated that signal accumulators 1 are associated with other components within the hydraulic circuit C including, for example, various control circuits for forward and reverse clutch operation.

Figure 3:
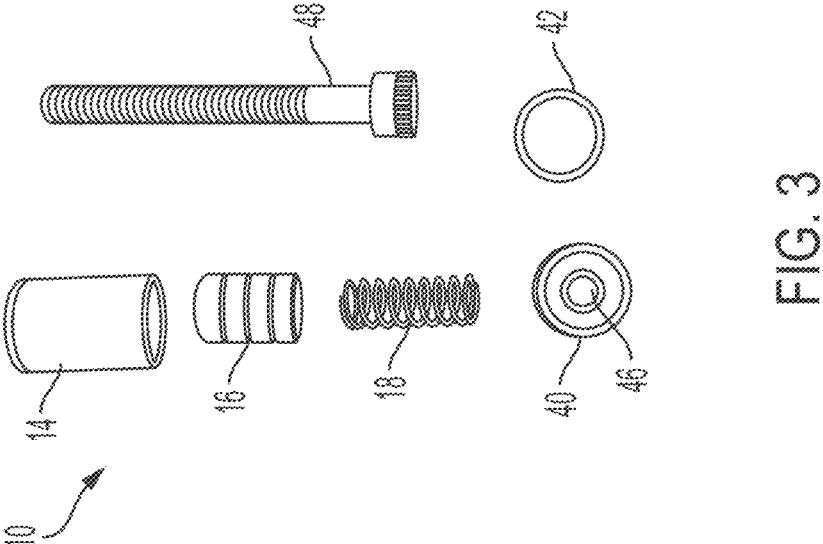
FIG. 3 illustrates various components of the kit.
Figure 2:
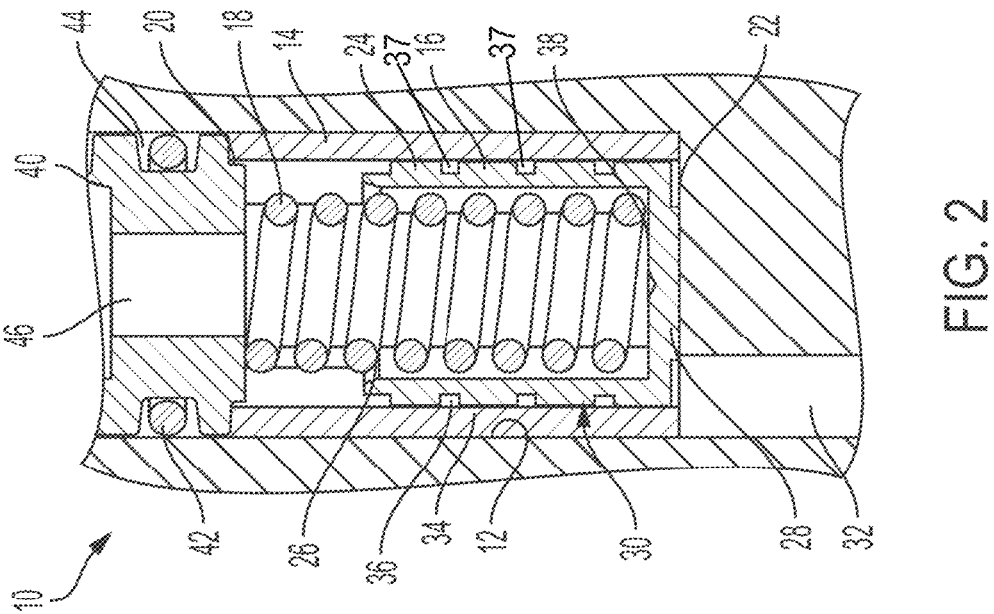
FIG. 2 is an illustration of an embodiment of the replacement accumulator piston kit.

FIG. 2 illustrates an embodiment of the replacement accumulator piston assembly 10 installed in the OE valve bore 12. The assembly 10 includes a sleeve 14 positioned in the OE valve bore 12, a piston 16 positioned in the sleeve 14, and a spring 18 (see FIG. 3) positioned in part in the piston 16 and in part extending beyond the piston 16. In an embodiment, the sleeve 14 has a cylindrical shape with open ends 20, 22. The piston 16 can have a cup-shaped body 30, having a cylindrical wall 24 with one open end 26 and one closed end 28. The spring 18 can be positioned in the piston open end 26 and reside, at least in part, in the piston body 30. The piston 16 is positioned in the sleeve 14 with the piston closed end 28 proximal the valve body port 32 which provides fluid flow into the accumulator bore 12. In an embodiment, an outer wall 34 of the piston 16 has one or more circumferential grooves or recesses 36 each configured to receive a seal 37 therein. In embodiments, the spring 18 abuts an inner end wall 38 of the piston 16.

A plug 40 is positioned to close the bore 12 and a seal 42, such as an O-ring is positioned in a circumferential recess 44 in the plug 40 to seal the accumulator piston assembly 10 in the valve bore 12. A through-hole 46 can be formed in the plug 40 to, for example, allow for readily removing the plug 40 to facilitate removal of the piston 16, spring 18 and/or sleeve 14. The through-hole 46 can be threaded so that a bolt 48 or other threaded tool/element can be threaded into the through-hole 46 for case of removing the plug 40. The plug 40 is at an end of the valve bore 12 opposite the fluid port 32. The through-hole 46 can also serve as a blow by exhaust for fluid that leaks by the piston 16.

The sleeve 14 is sized to fit into the OE valve bore 12 without modification (e.g., tooling or reaming) of the bore 12. In this configuration, the replacement accumulator piston assembly 10 can readily replace the OE accumulator piston, without modification to the valve body B. The sleeve 14 is fit in the valve bore 12 with a tight tolerance. A locking compound (not shown) may be used to secure or maintain the sleeve 14 in the bore 12.

For purposes of the following description regarding FIGS. 9A, 9B, 10A and 10B, it should be noted that these figures are inverted (upside down) relative to the assembly 10 illustrated in FIG. 2. FIGS. 9A and 9B illustrate another embodiment of a replacement accumulator piston assembly 210 installed in the OE valve bore 212. The assembly 210 includes a sleeve 214 positioned in the OE valve bore 212, a piston 216 positioned in the sleeve 214, and a spring 218 positioned in part in the piston 216 and in part extending beyond the piston 216.

In an embodiment, the sleeve 214 has a cylindrical shape with open ends 220, 222, and the piston 216 has a cup-shaped body 230, having a cylindrical wall 224 with one open end 226 and one closed end 228. The spring 218 can be positioned in the piston open end 226 and reside, at least in part, in the piston body 230. The piston 216 is positioned in the sleeve 214 with the piston closed end 228 proximal the valve body port 232 which provides fluid flow into the accumulator bore 212. In an embodiment, an outer wall 234 of the piston 216 has one or more circumferential grooves or recesses 236. In embodiments, the spring 218 abuts an inner end wall 238 of the piston 216.

The valve bore 212 includes an end wall 248 having a through-hole 246 formed therein. The through-hole 246 serves as a blow by exhaust for fluid that leaks by the piston 216. The sleeve 214 includes an inwardly beveled (or angled) end wall or chamfer 238 at the sleeve open end 220. A seal, such as the illustrated O-ring seal 242 is positioned in a capture region 239 defined in the valve bore 212 by the valve bore end wall 248 and side wall 250, and the sleeve chamfered end wall 238. The capture region 239 can have a reduced diameter relative to the sleeve 214 outer wall. The seal 242 seals the accumulator piston assembly 210 in the valve bore 212 and prevents leakage from the valve bore 212 and the leakage of any fluid that may be present between the sleeve 214 and the piston side wall 224. In the illustrated assembly, the portion of the spring 218 that extends beyond the open end of the piston 226 extends through sleeve open end 220 and contacts the valve bore end wall 248.

As with the previously disclosed embodiment, the sleeve 214 is sized to fit into the OE valve bore 212 without modification (e.g., tooling or reaming) of the bore 212. In this configuration, the replacement accumulator piston assembly 210 can readily replace the OE accumulator piston, without modification to the valve body. The sleeve 214 is fit in the valve bore 212 with a tight tolerance. A locking compound (not shown) may be used to secure or maintain the sleeve 214 in the bore 212.

It is envisioned that this configuration may be desirable due to the small size of this part (e.g., the piston 216) in that a conventional O-ring groove around the diameter may be difficult in execution. The chamfered sleeve bottom end 238 compresses the O-ring 242 against the bottom corner (i.e., the bottom wall 248 and side wall 250) of the valve bore 212. This requires less space for the seal 242, which allows for greater space for the spring 218 and piston 216 function. In addition, the O-ring 242 compressed against the valve bore end or bottom wall 248 prevents pressure loss between the sleeve 214 and the valve bore 212 which in turn directs the pressure onto the piston 216.

FIGS. 10A and 10B illustrate yet another embodiment of a replacement accumulator piston assembly 310 installed in the OE valve bore 312. The assembly 310 includes a sleeve 314 positioned in the OE valve bore 312, a piston 316 positioned in the sleeve 314, and a spring 318 positioned in part in the piston 316 and in part extending beyond the piston 316.

In an embodiment, the sleeve 314 has a cylindrical shape with open ends 320, 322, and the piston 316 has a cup-shaped body 330, having a cylindrical wall 324 with one open end 326 and one closed end 328. The spring 318 can be positioned in the piston open end 326 and reside, at least in part, in the piston body 330. The piston 316 is positioned in the sleeve 314 with the piston closed end 328 proximal the valve body port 332 which provides fluid flow into the accumulator bore 312. In an embodiment, an outer wall 334 of the piston 316 has one or more circumferential grooves or recesses 336. In embodiments, the spring 318 abuts an inner end wall 338 of the piston 316.

The valve bore 312 includes an end wall 348 having a through-hole 346 formed therein. The through-hole 346 serves as a blow by exhaust for fluid that leaks by the piston 316. The sleeve 314 includes an inwardly stepped end wall 338 at the sleeve open end 320. The inwardly stepped end wall 338 provides a region or seat 352 for a seal 342, such as the illustrated O-ring seal that is positioned and captured in a capture region 339 defined in the valve bore 312 by the valve bore side wall 350, valve bore end wall 348 and the sleeve stepped end wall 338. The capture region 339 can have a reduced diameter relative to the sleeve 314 outer wall. The seal 342 seals the accumulator piston assembly 310 in the valve bore 312 and prevents leakage from the valve bore 312 and the leakage of any fluid that may be present between the sleeve 314 and the piston side wall 324. In the illustrated assembly, the portion of the spring 318 that extends beyond the open end of the piston 326 extends through sleeve open end 320 and contacts the valve bore end wall 348.

As with the previously disclosed embodiment, the sleeve 314 is sized to fit into the OE valve bore 312 without modification (e.g., tooling or reaming) of the bore 312. In this configuration, the replacement accumulator piston assembly 310 can readily replace the OE accumulator piston, without modification to the valve body. The sleeve 314 is fit in the valve bore 312 with a tight tolerance. A locking compound (not shown) may be used to secure or maintain the sleeve 314 in the bore 312.

Figure 11A:
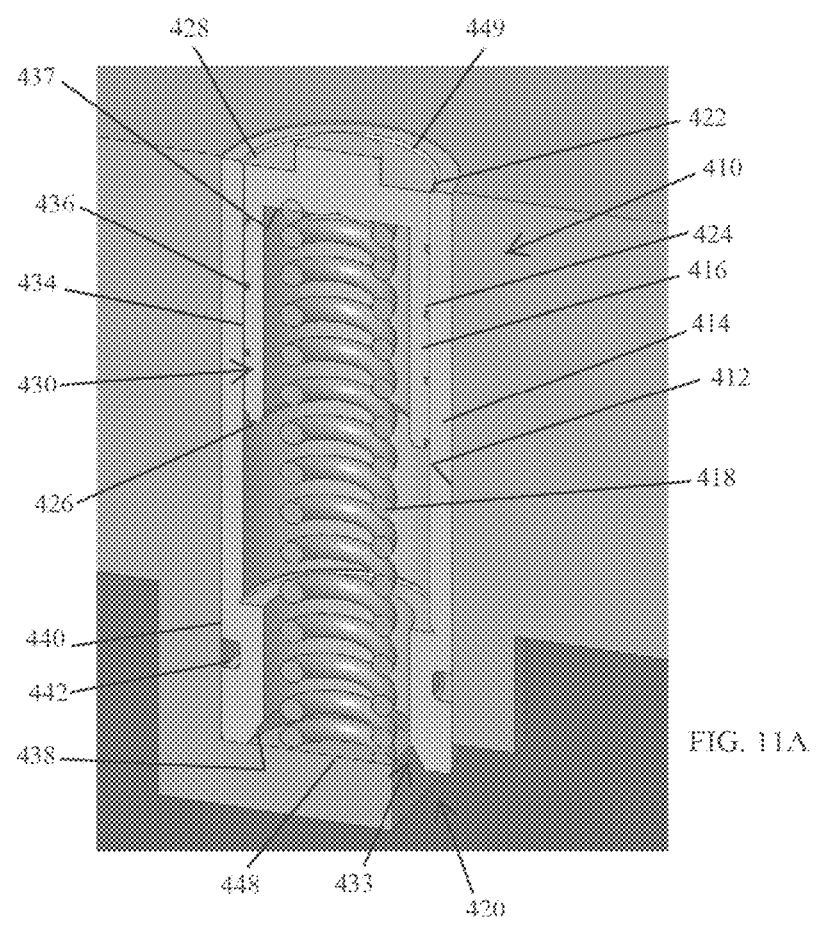
FIGS. 11A and 11B illustrate yet another embodiment of the replacement accumulator piston kit shown in a sectional perspective view, FIG. 11B showing the kit in place in the valve body and illustrating a mating portion of the valve body and a separator plate.
Figure 11B:
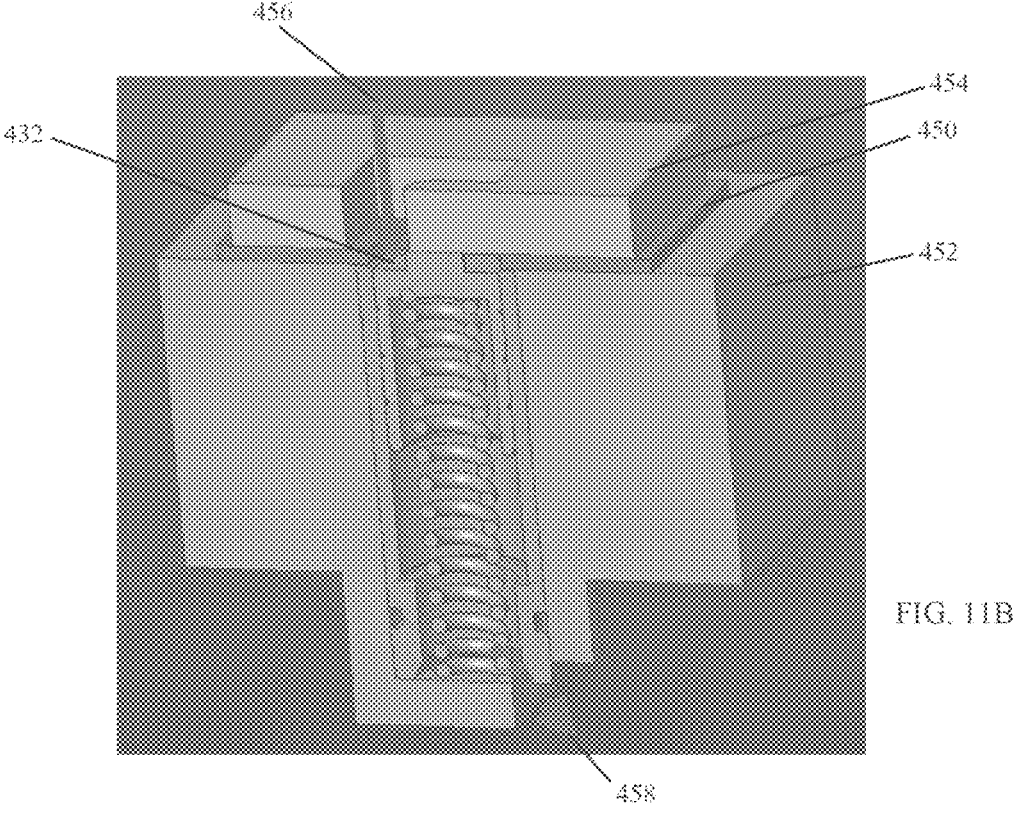

FIG. 11 illustrates still another embodiment of a replacement accumulator piston assembly 410 installed in the OE valve bore 412. The assembly 410 includes a sleeve 414 positioned in the OE valve bore 412, a piston 416 positioned in the sleeve 414, and a spring 418 positioned in part in the piston 416 and in part extending beyond the piston 416.

In embodiments, the sleeve 414 has a cylindrical shape with open ends 420, 422, and the piston 416 has a cup-shaped body 430, having a cylindrical wall 424 with one open end 426 and one closed end 428. The spring 418 can be positioned in the piston open end 426 and reside, at least in part, in the piston body 430. The piston 416 is positioned in the sleeve 414 with the piston closed end 428 proximal the valve body port (illustrated generally at 432) which provides fluid flow into the accumulator bore 412 (illustrated generally by the arrow at 456). In an embodiment, an outer wall 434 of the piston 416 has one or more circumferential grooves or recesses 436. In embodiments, the spring 418 abuts an inner end wall 437 of the piston 416.

The valve bore 412 includes an end wall 448 that has a through-hole 433 formed therein that serves as a blow by exhaust for fluid (illustrated generally at 458) that leaks by the piston 416. The sleeve 414 includes an inwardly angled inner end wall 438 at the sleeve open end 420. An outer wall 440 of the sleeve 414 includes a circumferential groove 442 for receipt of an O-ring (not shown) to provide a seal between the sleeve 414 and the valve bore 412. The seal seals the accumulator piston assembly 410 in the valve bore 412 and prevents leakage from the valve bore 412 and the leakage of any fluid that may be present between the sleeve 414 and the piston side wall 424. In the illustrated assembly, the portion of the spring 418 that extends beyond the open end of the piston 426 extends through sleeve open end 420 and contacts the valve bore end wall 448.

As with the previously disclosed embodiments, the sleeve 414 is sized to fit into the OE valve bore 412 without modification of the bore 412, and the replacement accumulator piston assembly 410 can readily replace the OE accumulator piston, without modification to the valve body. The sleeve 414 is fit in the valve bore 412 with a tight tolerance. A separator plate 450 is positioned on the portion of the valve body 452 in which the sleeve 414, piston 416 and spring 418 are installed and a mating portion 454 of the valve body is positioned on the separator plate 450. The separator plate and mating valve body portions can be used with all previously described embodiments. A locking compound (not shown) may be used to secure or maintain the sleeve 414 in the bore 412.

Figure 12A:
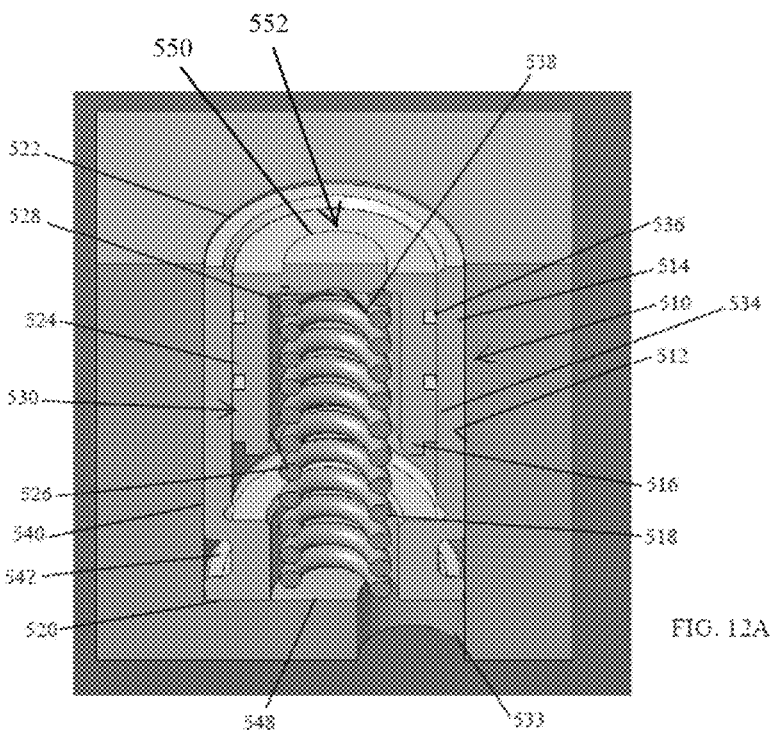
FIGS. 12A and 12B illustrate still another embodiment of a replacement accumulator piston kit shown in sectional front and perspective views.
Figure 12B:
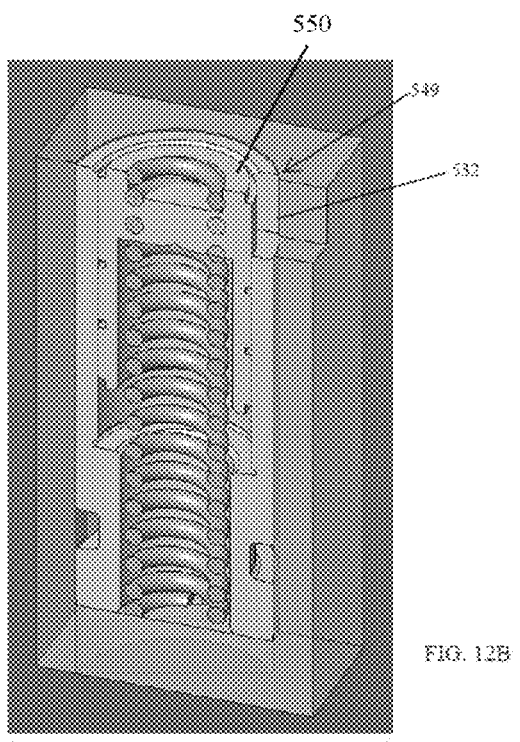

FIGS. 12A and 12B illustrate yet another embodiment of a replacement accumulator piston assembly 510 installed in the OE valve bore 512. FIGS. 12A and 12B differ only in that a lower region of the sleeve 514 in FIG. 12A is shorter than a lower portion of the sleeve 514 in FIG. 12B. The assembly 510 includes the sleeve 514 positioned in the OE valve bore 512, a piston 516 positioned in the sleeve 514, and a spring 518 positioned in part in the piston 516 and in part extending beyond the piston 516.

In embodiments, the sleeve 514 has a cylindrical shape with open ends 520, 522, and the piston 516 has a cup-shaped body 530, having a cylindrical wall 524 with one open end 526 and one closed end 528. The spring 518 can be positioned in the piston open end 526 and reside, at least in part, in the piston body 530. The piston 516 is positioned in the sleeve 514 with the piston closed end 528 proximal the valve body port 532 (see, FIG. 12B) which provides fluid flow into the accumulator bore 512. In embodiments, an outer wall 534 of the piston 516 has one or more circumferential grooves or recesses 536. In embodiments, the spring 518 abuts an inner end wall 538 of the piston 516.

The valve bore 512 includes an end wall 548 that can have a through-hole 533 formed therein to serve as a blow by exhaust for fluid that leaks by the piston 516. An outer wall 540 of the sleeve 514 includes a circumferential groove 542 for receipt of an O-ring (not shown) to provide a seal between the sleeve 514 and the valve bore 512. The seal seals the accumulator piston assembly 510 in the valve bore 512 and prevents leakage from the valve bore 512 and the leakage of any fluid that may be present between the sleeve 514 and the piston side wall 524. In the illustrated assembly, the portion of the spring 518 that extends beyond the open end of the piston 526 extends through sleeve open end 520 and contacts the valve bore end wall 548.

As with the previously disclosed embodiments, the sleeve 514 is sized to fit into the OE valve bore 512 without modification of the bore 512, and the replacement accumulator piston assembly 510 can readily replace the OE accumulator piston, without modification to the valve body. The sleeve 514 is fit in the valve bore 512 with a tight tolerance. A locking compound (not shown) may be used to secure or maintain the sleeve 514 in the bore 512. The piston 516 includes a projection or stop 550 on an outer surface 552 of the piston closed end 528. The stop prevents the piston 516 from topping out (or bottoming out) so as to close off the valve body port 532.

It is anticipated that this configuration may be desirable due to the small size of this part in that a conventional O-ring groove formed in the entirety of the sleeve, around the diameter of the sleeve, may be difficult in execution. The stepped sleeve bottom end wall 338 compresses the O-ring 342 against the bottom corner (i.e., the bottom wall 350 and side wall 348) of the valve bore 312. This requires less space for the seal 342, which allows for greater space for the spring 318 and piston 316 function.

In addition, the O-ring 342 compressed against the valve bore bottom wall 350 prevents pressure loss between the sleeve 314 and the valve bore 312 which in turn directs the pressure onto the piston 316.

Tests were conducted to determine whether the smaller diameter replacement piston 16 (and thus smaller volume of the accumulator) has an adverse effect on the function of the accumulator and the hydraulic circuit compared to an accumulator with an OE piston.

Figures 5, 6:
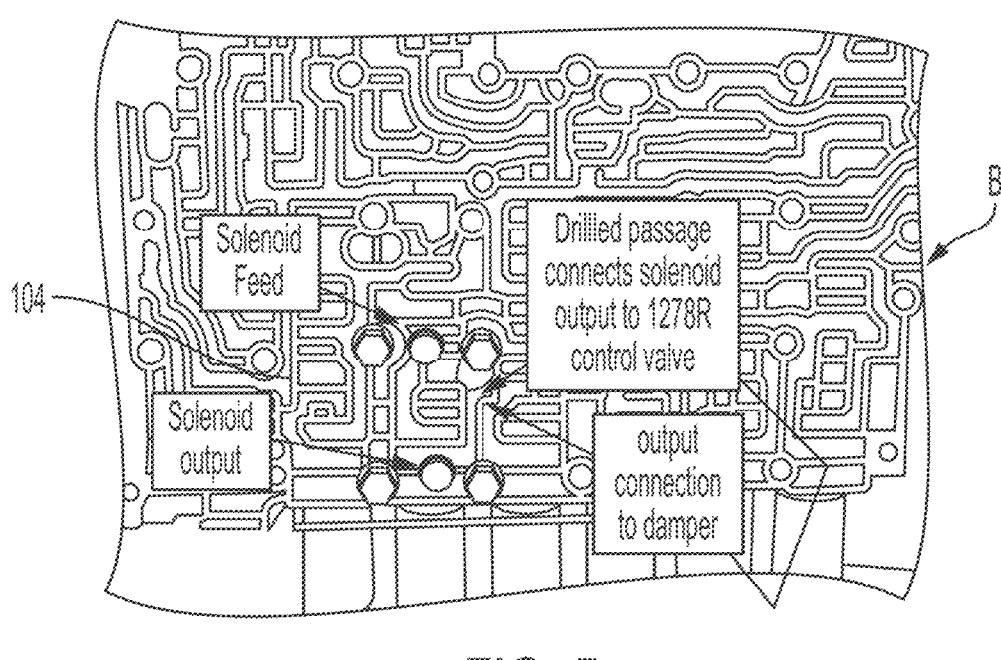
FIGS. 5 and 6 are illustrations of a standard test set up for testing the accumulator.

Referring now to FIGS. 5 and 6, a test set 102 up was constructed in which an acrylic plate 104 was installed on the back side of a control valve body B. Taps 108 were made in the plate 104 for solenoid feed 110 and solenoid output 112, and solenoid output was connected to the accumulator. Passages were drilled for fluid flow connections 114 from the solenoid to the control valve and signal accumulator piston. A dial indicator (not shown) was installed to monitor the piston stroke via a pin inserted into the spring pocket (i.e., piston open end). This was done for the accumulator with the OE piston and the present drop-in accumulator piston assembly 10.

Figure 7:
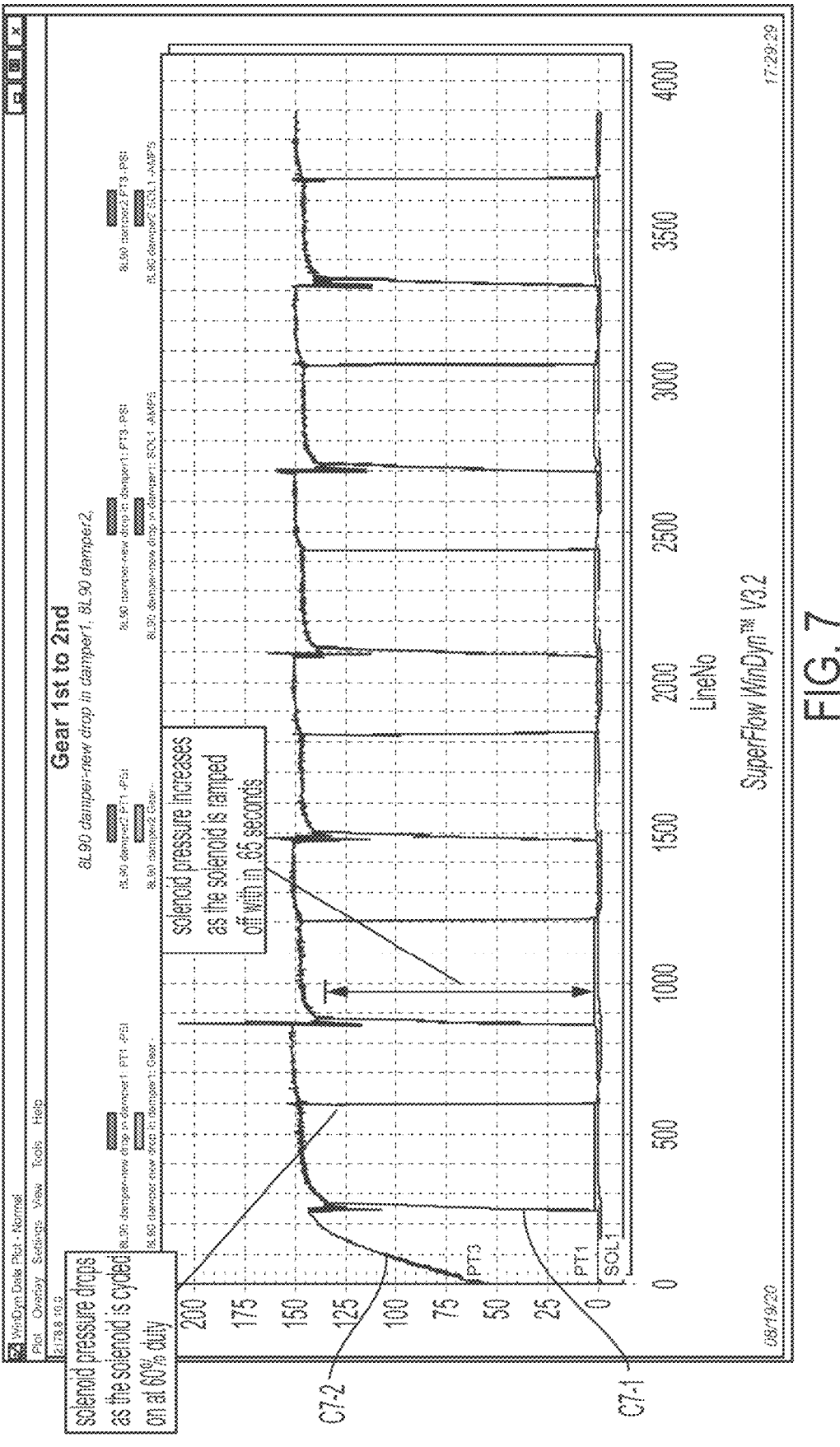
FIGS. 7 and 8 are graphical representations of a comparison of control line signal pressure versus time in an accumulator with the OE piston and in an accumulator with the present drop-in accumulator piston.
Figure 8:
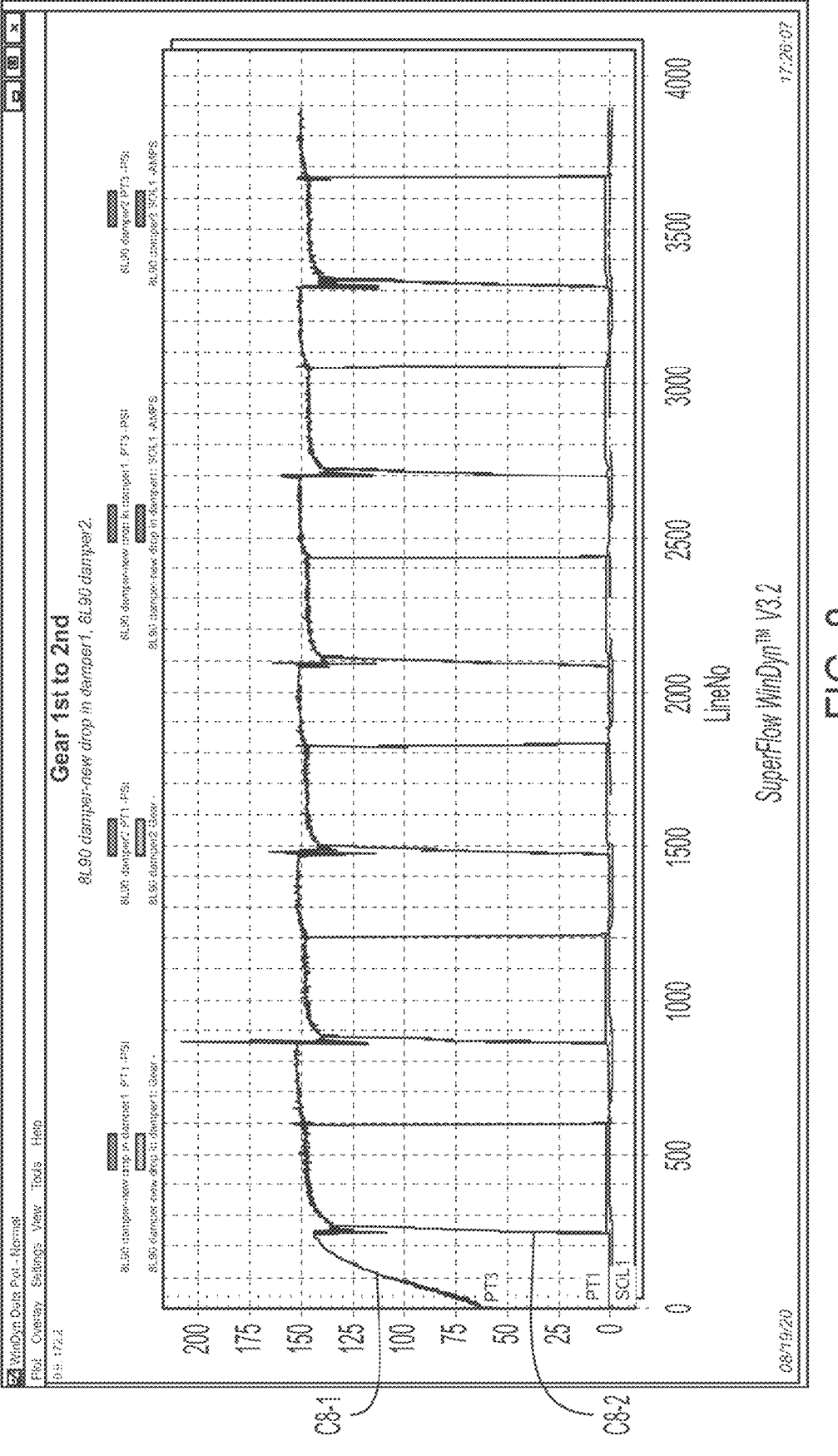

FIGS. 7 and 8 illustrate graphically a comparison of the control line signal pressure versus time with an accumulator with the OE piston and the present drop-in accumulator piston. In FIG. 7 the pump pressure (pressure supplied to the solenoid in psi) is shown on the y-axis and time (in milliseconds) is shown on the x-axis. Curve 7-1 (C7-1) is the solenoid feed/pump pressure in cycling of the normally high solenoid (with a normally high solenoid, the solenoid is electrically actuated and the fluid flow through the solenoid valve decreases with increasing electrical current, conversely with a normally low solenoid, the solenoid is electrically actuated and there is fluid flow through the solenoid valve that increases with increased electrical current). The solenoid was cycled five times.

In FIG. 7, Curve 7-2 (C7-2) shows the solenoid/feed pump pressure flowing to the solenoid. Curve 7-1 (C7-1) shows the flow response/solenoid output pressure as the solenoid is actuated between solenoid duty 0% and solenoid duty at 60%. When the solenoid duty drops to zero (0), the pressure in the system increases (solenoid output increases). The pressure in the system with the OE piston and the present drop-in piston overlap one another in Curve 7-1 (C7-1), and as such it appears as one curve. This shows that the OE accumulator piston and the present drop-in accumulator piston function equally.

FIG. 8 is a repetition of the test results in FIG. 7, with Curve 8-1 showing solenoid feed/pump pressure to the normally high solenoid (C8-1) and Curve 8-2 (C8-2) showing the solenoid output pressure. Again, the solenoid output pressure with the OE piston and the present drop-in piston overlap one another in Curve 8-2 (C8-2), and as such it appears as one curve, and again, this shows that the OE accumulator piston and the present drop-in accumulator piston function equally.

Table 1, below shows a comparison of the OE piston stroke to the present drop-in signal accumulator piston stroke at various solenoid duty percentages which correspond to solenoid output pressure (in psi) during the same tests captured in FIG. 8.

TABLE 1

| Comparison of OE and Drop-in Piston Stroke at Various Solenoid Duties | | | |
|---|---|---|---|
| Solenoid duty % | Solenoid output (psi) | OE piston stroke | Drop-in piston stroke |
| 60 | 0 | 0 | 0 |
| 48.9 | 5 | 0.02 | 0.015 |
| 44 | 24 | 0.032 | 0.035 |
| 36.9 | 55 | 0.051 | 0.055 |
| 29 | 88 | 0.072 | 0.075 |
| $0^{n1}$ | 125 | 0.093 | 0.095 |

Note:
$^{n1}$—at 0% duty cycle the pistons bottom out in the bore.

As can be seen from Table 1, the stroke for the accumulator drop-in piston and the stroke for the accumulator with the OE piston are essentially equal. As such, in viewing the system pressure test results and the piston stroke test results, it can be seen that the present accumulator drop-in piston functions as well as the OE accumulator piston.

A method to correct and/or reduce the wear of an OE control valve body B accumulator piston bore 12 includes removing the OE accumulator piston and spring from the accumulator piston bore 12. The method further includes installing a sleeve 14 in the bore 12, and installing a replacement piston 16 having a cup-shaped body 30 with an open end 26 and a closed end 28 in the sleeve 14. The piston 16 is installed with the open end 26 facing out and the closed end 28 proximal the valve body port 32 into the accumulator bore 12.

A spring 18 is positioned in the piston open end 26 and resides, at least in part, in the piston body 30 and in part extends out of the piston body 30. In methods the piston 16 has one or more circumferential grooves or recesses 36 in an outer wall 34 of the piston 16.

A plug 40 is installed in the accumulator piston bore 12 to enclose the sleeve 14, piston 16 and spring 18 in the bore 12. A seal 42 can be positioned in a circumferential groove or recess 44 in the plug 40. In methods, the plug 40 has an opening, such as a central through-hole 46. The through-hole 46 can be threaded so that a threaded member, such as a threaded tool or bolt 48 can be used to install and/or remove the plug 40. In methods, the through-hole 46 can be used as a vent or blow by exhaust for fluid that leaks the piston 16.

It is anticipated that a hard-coat anodized aluminum piston can be used to reduce and/or prevent premature wear. It is also anticipated that the annular groove(s) in the piston will reduce and/or prevent premature wear. It is further anticipated that O-rings located on the sleeve, between the sleeve and the valve body bore provide a positive seal to prevent critical pressure leakage. It is still further anticipated that mating/specifically specified springs can re-establish OE dampening action It will be recognized by those skilled in the art that there are numerous vehicle transmissions for which the present drop-in accumulator assembly can be used. In particular, it has been identified that the present drop-in accumulator assembly functions well for certain General Motors transmissions, namely the GM 8L90 and the GM 8L45 transmissions. It is anticipated that the present drop-in accumulator assembly will function well in those transmission control valve that utilize piston-type accumulators to dampen or smooth out the signal fluid pressure in hydraulic systems.

It will be appreciated that the present accumulator drop-in piston restores hydraulic control, maintaining proper fluid line pressure control through an assembly that can be installed in the OE control solenoid valve body. Advantageously, the present drop-in piston accomplishes this without modification of the control valve body, and has been shown to function as well as the larger OE piston and without loss of control signal pressure control.

In the present disclosure, the words "a" or "an" are to be taken to include both the singular and the plural. Conversely, any reference to plural items shall, where appropriate, include the singular. All patents and published applications referred to herein are incorporated by reference in their entirety, whether or not specifically done so within the text of this disclosure.

It will also be appreciated by those skilled in the art that any relative directional terms such as side(s), upper, lower, top, bottom, rearward, inboard, forward, outboard and the like may be for explanatory purposes only and may not be intended to limit the scope of the disclosure. It will further be appreciated that features from any one disclosed embodiment may be used in any other disclosed embodiment.

From the foregoing it will be observed that numerous modifications and variations can be made without departing from the true spirit and scope of the novel concepts of the present disclosure. It is to be understood that no limitation with respect to the specific embodiments illustrated is intended or should be inferred.

What is claimed is:

1. A drop-in signal accumulator piston assembly to replace an original equipment (OE) signal accumulator piston in a vehicle transmission hydraulic circuit, the OE signal accumulator piston positioned in a bore in a valve body having a fluid port, the drop-in signal accumulator piston assembly comprising:
   a cylindrical sleeve having open first and second ends, wherein an internal diameter of the cylindrical sleeve reduces at a transition between the first and second open ends thereof, and wherein the cylindrical sleeve is configured to be positioned within the bore in the valve body;
   a piston positioned in the sleeve, the piston being cup-shaped, having an open end and a closed end; and
   a spring positioned in part in the open end of the piston and in part extending beyond the open end of the piston, wherein the sleeve is positioned in the valve body bore, with the piston and the spring positioned in the sleeve, wherein the sleeve, the piston, and the spring are enclosed within the valve body bore, and wherein the cylindrical sleeve is configured such that the transition in the internal diameter limits movement of the piston in opposing the spring.

2. The assembly of claim 1, wherein the piston includes at least one circumferential recess in an outer wall thereof.

3. The assembly of claim 1, wherein an end of the spring abuts an inner end wall of the piston and an opposite end of the spring abuts an inner wall of the valve body.

4. The assembly of claim 1, wherein the assembly is configured such that the sleeve, the piston, and the spring are retained within the valve body bore when a plate is coupled to the valve body.

5. The assembly of claim 4, the spring biases the piston towards the plate.

6. The assembly of claim 1, wherein the piston comprises a circumferential recess, further comprising a seal positioned in the recess and configured to seal between the piston and the sleeve.

7. The assembly of claim 6, wherein the recess is a first recess and the seal is a first seal, wherein the sleeve includes a circumferential second recess, further comprising a second seal positioned in the second recess.

8. A drop-in signal accumulator piston assembly to replace an original equipment (OE) signal accumulator piston in a vehicle transmission hydraulic circuit, the OE signal accumulator piston positioned in a bore in a valve body having a fluid port, the drop-in signal accumulator piston assembly comprising:
   a cylindrical sleeve having open first and second ends, wherein an internal diameter of the cylindrical sleeve reduces at a transition between the first and second open ends thereof;
   a piston positioned in the sleeve, the piston being cup-shaped, having an open end and a closed end, and wherein the cylindrical sleeve is configured such that the transition in the internal diameter limits movement of the piston within the cylindrical sleeve;

a spring positioned in part in the open end of the piston and in part extending beyond an end of the piston, wherein the sleeve is positioned in the valve body bore, with the piston and the spring positioned in the sleeve, and wherein the sleeve, the piston, and the spring are enclosed within the valve body bore, and wherein the sleeve includes a receiving region for receiving a seal, the seal positioned between the sleeve and the valve body bore.

9. The assembly of claim 8, wherein the receiving region is a circumferential recess.

10. The assembly of claim 9, wherein the sleeve has a first wall thickness and a second wall thickness greater than the first wall thickness, and wherein the circumferential recess is a portion of the sleeve at the second wall thickness.

11. The assembly of claim 8, wherein the receiving region is a chamfered end wall in the sleeve.

12. The assembly of claim 8, wherein the receiving region is a stepped region in the sleeve.

13. A method for replacing an original equipment (OE) signal accumulator piston in a vehicle transmission hydraulic circuit, the OE signal accumulator piston positioned in a bore in a valve body having a fluid port, the method comprising:

removing the OE signal accumulator piston from the bore;

installing a cylindrical sleeve having open first and second ends in the bore, wherein an internal diameter of the cylindrical sleeve reduces at a transition between the first and second open ends thereof;

positioning a piston in the cylindrical sleeve; and positioning a spring in part in the piston and in part extending beyond the piston, wherein the cylindrical sleeve is configured such that the transition in the internal diameter limits movement of the piston within the cylinder sleeve in opposing the spring;

wherein the sleeve, the piston, and the spring are enclosed within the valve body bore.

14. The method of claim 13, wherein the piston includes a plurality of circumferential recesses in an outer wall thereof.

15. The method of claim 13, wherein the sleeve includes a circumferential recess, further comprising positioning a seal in the recess.

16. The method of claim 15, wherein the sleeve has a first wall thickness and a second wall thickness greater than the first wall thickness, and wherein the circumferential recess is in a portion of the sleeve at the second wall thickness.

17. The method of claim 13, further comprising removing a plate to access the bore before removing the OE signal accumulator piston from the bore.

18. A drop-in signal accumulator piston assembly to replace an original equipment (OE) signal accumulator piston in a vehicle transmission hydraulic circuit, the OE signal accumulator piston positioned in a bore in a valve body having an open end and a fluid port, the drop-in signal accumulator piston assembly comprising:

a cylindrical sleeve having open first and second ends, one of the first and second open ends having a reduced outer diameter region relative to an outer wall of the sleeve, and wherein an internal diameter of the cylindrical sleeve reduces at a transition between the first and second open ends thereof;

a piston positioned in the sleeve, wherein the cylindrical sleeve is configured such that the transition in the internal diameter limits movement of the piston within the cylindrical sleeve;

a spring positioned in part in the piston and in part extending beyond an end of the piston; and a seal positioned at the reduced outer diameter region, wherein the sleeve is positioned in the valve body bore, with the seal, the piston, and the spring, such that the seal is positioned between side and bottom walls of the valve body bore and wherein the seal provides a seal between the valve body bore and the sleeve.

19. The assembly of claim 18, wherein the reduced outer diameter region is a chamfer formed in the sleeve.

20. The assembly of claim 18, wherein the seal is a first seal, wherein the piston includes a circumferential recess, further comprising a second seal positioned in the recess that seals between the sleeve and the piston.

* * * * *